United States Patent [19]

Robinson

[11] Patent Number: 4,751,570
[45] Date of Patent: Jun. 14, 1988

[54] GENERATION OF APPARENTLY THREE-DIMENSIONAL IMAGES

[76] Inventor: Max Robinson, 201 Derby Road, Nottingham, NG7 1QJ, England

[21] Appl. No.: 806,523

[22] Filed: Dec. 9, 1985

[30] Foreign Application Priority Data

Dec. 7, 1984 [GB] United Kingdom ............... 8430980

[51] Int. Cl.[4] ............................................. H04N 13/02
[52] U.S. Cl. ........................................ 358/88; 352/65; 358/210; 358/228
[58] Field of Search ................. 358/88, 92, 3, 210, 358/108, 228; 352/65, 57

[56] References Cited

U.S. PATENT DOCUMENTS

| | | | |
|---|---|---|---|
| 2,417,446 | 3/1947 | Reynolds | 358/92 |
| 3,457,364 | 7/1969 | Carrillo | 358/92 |
| 3,784,738 | 1/1974 | Natter | 358/88 |
| 3,818,125 | 6/1974 | Butterfield | 358/92 |
| 4,418,993 | 12/1983 | Lipton | 352/57 |
| 4,558,368 | 12/1985 | Aoki | 358/228 |
| 4,559,555 | 12/1985 | Schoolman | 358/210 |

Primary Examiner—Howard W. Britton
Attorney, Agent, or Firm—Hall, Myers & Rose

[57] ABSTRACT

A stereo-camera head is provided, particularly for robotic applications, in which the parameters of focus, zoom and camera convergence are adjusted by remotely controlled motor drives. Camera separation distance and iris function can be similarly controlled. Twin cameras can be mounted on a common base by means of camera cradles pivotally mounted on the base or by means of rotary carriers that are mounted to traverse along respective lead screws driven by respective stepper motors. Alternatively, there may be a single camera lens system transmitting both left and right images received from left and right movable optical elements via a beam splitter/combiner. Two CCD imaging chips can receive the left and right images from the single lens system via a second beam splitter/combiner. A controlling micro-computer can be employed to keep the stereo images within human tolerance of fusion limits.

22 Claims, 5 Drawing Sheets

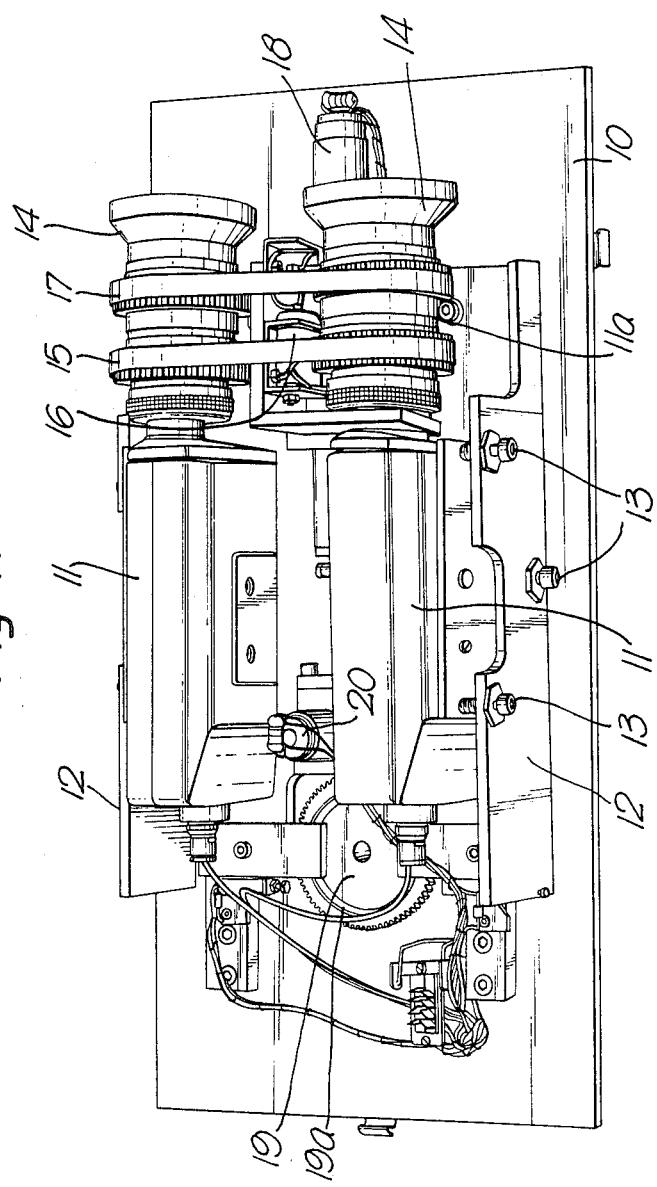

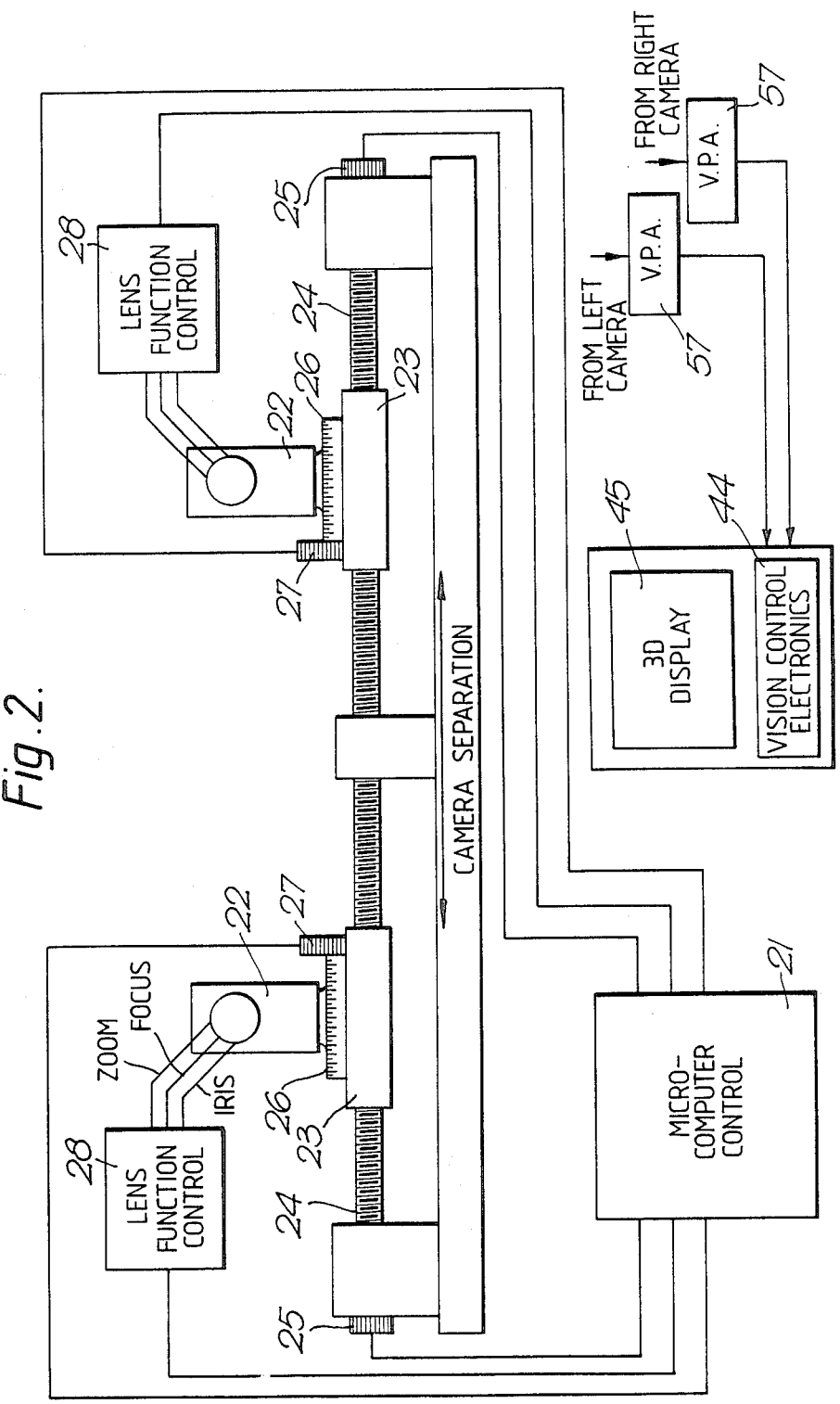

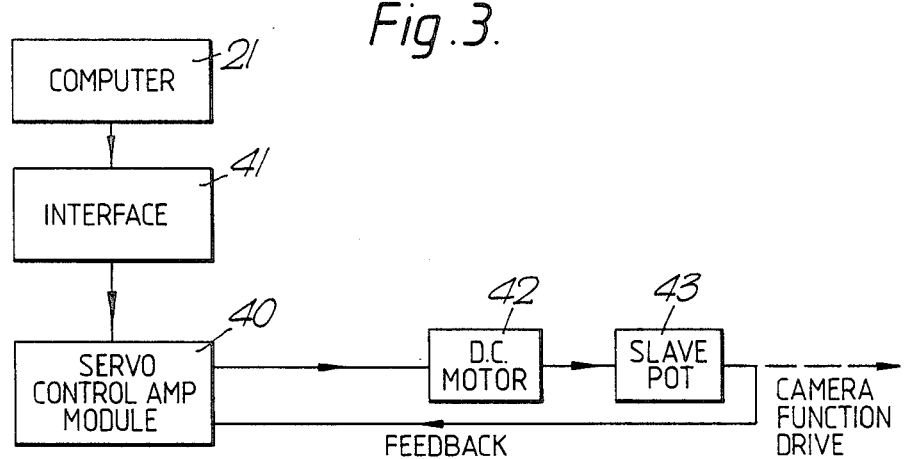
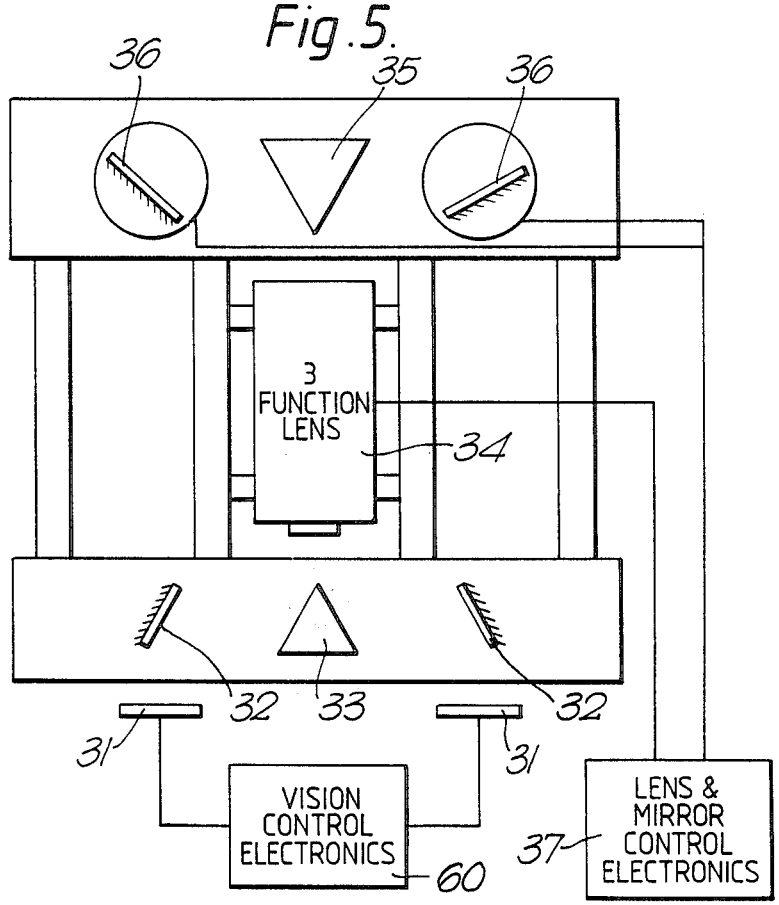

GENERATION OF APPARENTLY THREE-DIMENSIONAL IMAGES

This invention relates to the generation of apparently three-dimensional images. While the invention will be described in the context of television displays, it is to be understood that the techniques of the invention are not limited to this but can also be applied to imaging systems employing other forms of wave energy such as infra-red radiation and X-rays.

In the generation of 3-D television images a considerable amount of prior work has been done in regard to stereoscopic viewers but little attention has been paid to the cameras that observe the object or scene of interest and of which an image is to be created. It is therefore an aim of the present invention to provide an improved arrangement, the use of which produces a more versatile three-dimensional viewing system and a better and more acceptable display to the user.

According to the present invention, there is provided a stereo-camera head in which some or all of the parameters involved in stereoscopic viewing are remotely or automatically adjustable while the camera is in use.

In one arrangement twin cameras are employed with a fixed camera base, and small electric motor drives are provided to control focus and zoom of each lens system and also to adjust the convergence angle of the cameras. More sophisticated embodiments provide for variation of the camera separation distance and automatic adjustment of the principal stereoscopic vision parameters by a preprogrammed electronic control system. If desired, provision can be made for individual users of the equipment to test and set in their own personal limits in regard to tolerance of fusion of images. A further embodiment employs a common lens system serving two CCD chips, together with intelligent optics at the front end of the lens.

Arrangements according to the invention will now be described by way of example and with reference to the accompanying drawings, wherein:

FIG. 1 is a perspective view from above of a twin stereo-camera head embodying the invention;

FIG. 2 is an elevational block diagram of a twin stereo-camera head according to a second embodiment;

FIG. 3 is a block diagram of one of a number of servo motor systems employed in the embodiment of FIG. 2;

FIG. 5 is a diagrammatic plan of a further embodiment, and

Figure 4:
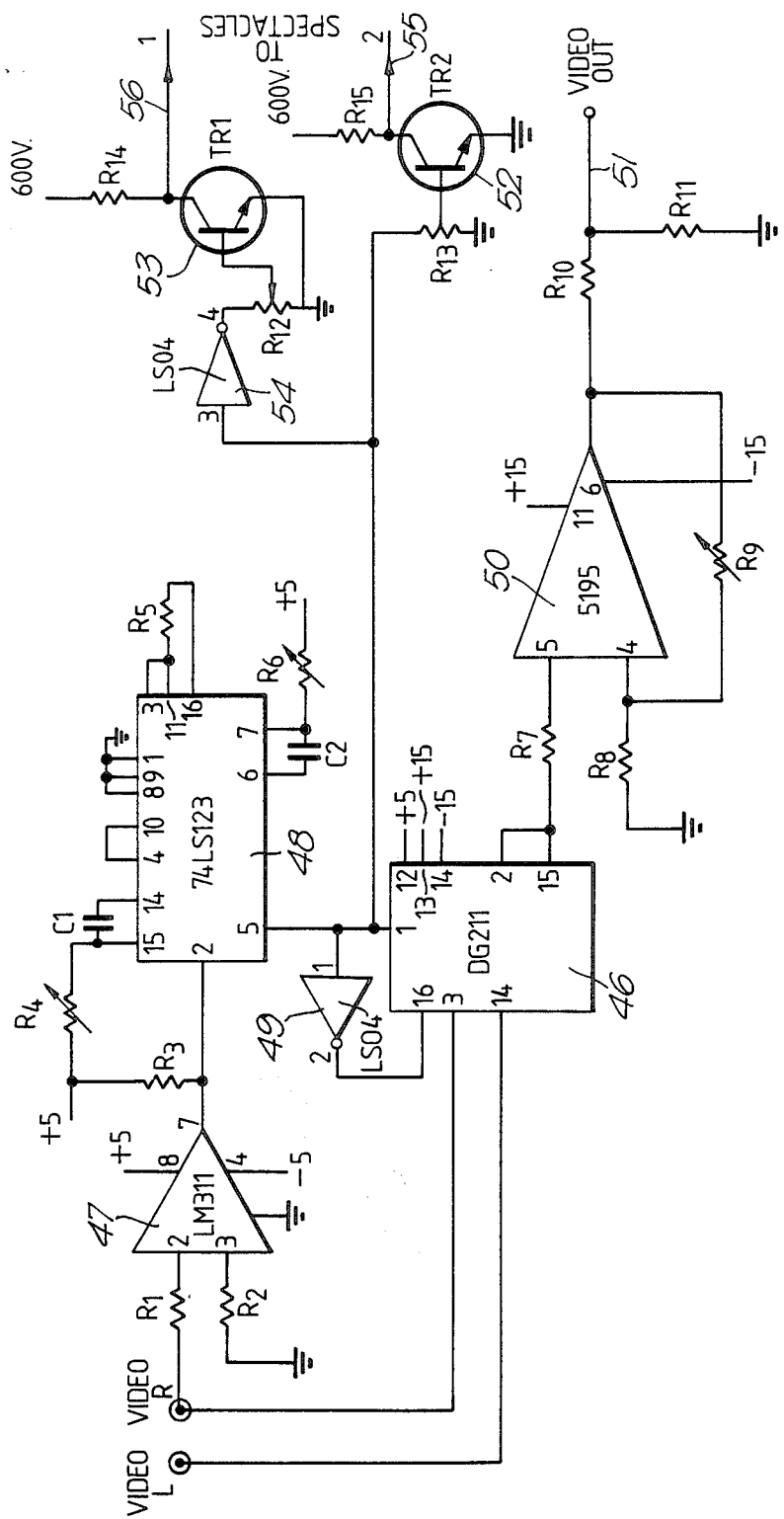
FIG. 4 is a circuit block diagram of vision control electronics used in the embodiment of FIG. 2.

Three-dimensional television displays for use in situations where the distance to the object of principal interest is variable (e.g. when the cameras are mounted on a remotely controlled vehicle) are very demanding on system hardware. They require the ability to mimic the human optical system's functions of convergence and accommodation, although for robotic applications the adjustments need not necessarily be made simultaneously.

Referring now to FIG. 1 of the drawings, this shows, in perspective view from above, a twin camera head with facilities for zoom and for varying the convergence of the cameras, as well as focussing. Each of the two television cameras 11 is clamped securely in a respective support cradle 12 mounted on a common bedplate 10, one of the cradles providing for geometrical alignment of its camera by means of three spring-loaded adjusting screws 13. This enables the left and right camera images to be accurately registered when overlayed on the television monitor screen. A standard television test-card can be used for the alignment procedure.

Parallel tracking of the zoom control, and focus control of the two camera lenses 14, is achieved mechanically in this instance. A toothed, flexible belt 15 is fitted around the focus adjustment ring on each lens and around a toothed drive gear on the shaft of a 12 V d.c. motor 16. The motor can be driven in either direction and is fitted with limit switches. Zoom control is achieved similarly by means of a toothed belt 17 and a motor 18. The flexibility of the two belts allows for the movement necessary to achieve a degree of convergence control.

Convergence control is achieved by pivoting the support cradles 11 in the horizontal plane about pivotal connections 11a to the bed plate near their front ends. At the back of each cradle there is a peg which fits into a spiral groove 19a formed in a nylon gear wheel 19 common to both cameras which can be driven in either direction by a 12 V d.c. motor 20 through appropriate drive gearing. This gives smooth simultaneous movement of the cameras between the near and far limits of convergence. Limit switches are incorporated in order to define maximum and minimum convergence positions. The amount of movement is only in the range of $\frac{1}{2}°$ to $2\frac{1}{2}°$ and since the pivot points of the camera mounting cradles are substantially under the zoom control and focus adjustment belts there is no change of separation distance at this region that the belts cannot accommodate.

The zoom and focus lens drives, and also the convergence control if desired, can be arranged as feedback servomechanisms by the use of position sensing potentiometers. These are the principal stereoscopic parameters and, in a simple system, other parameters, such as camera separation, can be ignored if a defined television monitor screen size is employed and an average value is selected for the maximum permissible parallax for human observers. Several other systems will now be described.

In a stereo-camera head which does not have a camera separation facility, a technique of auto-focus linked to camera convergence will now be proposed. This enables the use of stereo-cameras to be much simplified for certain applications.

Firstly, the range to the object of principal interest is determined. The cameras can then be adjusted to converge on this point and the two lenses focussed appropriately. The range to the object can be found ultrasonically, as in the Polaroid auto-focussing camera, or by using a light-spot technique. Having obtained the range information, the stereo-camera may have its convergence point and focus adjusted under the control of an electronic circuit containing an EPROM. This circuit will have previously been set-up with a program to respond to range information signals and adjust the stereo-camera parameters accordingly.

Whilst the ultrasonic ranging system is relatively simple, consisting of an ultrasonic transmitter/receiver combination mounted on the stereo-camera, the light spot technique is more sophisticated and accurate.

Work has previously been carried out using structured light and stereoscopic television displays in order to solve the correspondence problem encountered in left and right image matching. It has been shown that if a coherent light spot (He Ne laser) is projected on to an object viewed by a stereoscopic vision system then the two images of this spot can be detected in the video signal. Objects at any position other than the convergence point will give rise to conjugate image points and the system can therefore be made to adjust its convergence so as to superimpose these left and right image points. The focus function of the lenses is slaved to the convergence function as before.

The system described can advantageously be used on a remote controlled robot vehicle, or even as a simple-to-use hand-held stereo-camera.

In the above arrangements, camera separation is fixed, but this can be an important stereoscopic vision parameter which can have a powerful influence on the perceived stereoscopic image. It is particularly advantageous to be able to increase the camera base as object distances become greater.

FIG. 2 of the drawings shows diagrammatically a stereo-camera which embodies a small micro-computer 21 to control the three more important parameters affecting the stereoscopic depth of field. In addition, focus control linked to convergence and lens iris control are available. By putting fixed values into the computer memory for the particular monitor screen size to be used and for the average value of maximum permissible parallax for humans, the computer will control the stereo camera head in such a way as to always present images within the tolerance of fusion limits of the average observer.

Each camera 22 has its own linear translation stage 23 which is on a precision linear guide and driven by a respective stepper motor 25 via a lead screw 24. Rotation stages 26 are mounted on each of the linear stages 23 and again these are driven by respective stepper motors 27. Control of the positions of both linear stages and both rotary stages is achieved through the microcomputer 21. The cameras 22 are provided with a means of mechanical alignment to enable accurate registration of the two camera images to be achieved.

In this way the convergence point and the camera base of the stereo-camera system can both be changed. This enables a fixed object to be viewed with a variety of different stereoscopic depths of field, it being possible to make the cameras lock on to a particular object distance whilst varying the camera separation.

The zoom, focus and iris lens functions of each camera are achieved using individual small electric servo motors with position encoding feedback potentiometers. Optical encoders can also be used. The lens function information is interfaced with the micro-computer control, as at 28, to achieve control of the focus of each lens as the convergence point of the system is varied, all within the limits for ease of fusion of the images by human eyes that are placed upon the system. An alternative to iris control by the computer is to use one of the auto iris lens sytems currently available.

Regarding each lens function control 28, this will generally comprise three servo-motor systems each as shown in FIG. 3. A servo-control differential amplifier module 40 receives input signals from the microcomputer 21 via a suitable interface 41 and supplies a drive signal to a d.c. electric motor 42 which applies the mechanical drive to the respective camera lens control function. A servo-potentiometer 43 also driven by the motor 42 delivers an electrical feedback signal to the servo-control amplifier module 40 whereby the system drives to a null signal condition at a mechanical position dependent on the input signal from the microcomputer.

The microcomputer used can be an Apple II, 8 bit machine which employs the 6502 micro-processor chip. The programming language for this machine is a form of Basic known as Applesoft. The program for present purposes will be found appended to this patent specification.

The outputs of the left and right cameras 22 are applied to vision control electronic circuitry 44 which generates a video signal suitable for application to any compatible video display television monitor 45. This circuitry also generates two switching output signals for controlling the spectacle switching circuit of a stereoscopic viewer, as known in the art, to be worn by the human observer of the 3D image. The circuitry 44 is shown in more detail in FIG. 4. The two camera signals are applied to a DG 211 analogue switch multiplexer 46 and one is also applied to a voltage comparator 47. The output of the voltage comparator is fed to a 74LS123 dual monostable 48 coupled to the multiplexer both directly and through an inverter 49. The multiplexer 46 feeds a video amplifier 50 which supplies the video output signal at 51.

To switch the spectacles of the stereoscopic viewer (not shown) in synchronism with the operation of the multiplexer 46, the switching output of the monostable 48 is also applied to a pair of power transistors 52, 53, in one case directly and in the other case through an inverter 54, so that the transistors supply switched outputs 55, 56 for controlling the stereoscopic viewer. Although in the example described the vision control electronics are designed for presentation of stereoscopic images using the field sequential switching technique, other electronics can be employed whereby the stereo-camera head is used to feed stereoscopic television displays based on other available techniques, e.g. the red/-green anaglyph system, polarized screens system, split screen image system and so on.

Since tolerance of fusion of images varies from person to person, it is possible, instead of setting in an average tolerance, to allow each individual user of the stereo-camera system to perform a self-test for tolerance of fusion and set his own limits.

A pair of co-ordinated measuring marks are injected into the video display in such a way as to be presented as conjugate points in the stereo-image. By using two video position analysers 57 one in each video line, between the cameras 22 and the multiplexing electronics 44 it is possible to project left and right measuring marks into the display. The video position analysers (For-A Co. Ltd., type VPA 1000) inject small cross-wires into the video display whose x and y co-ordinates are displayed as they are moved around the area of the monitor screen.

The operator can control the disparity of these marks so that he can determine the limits of his own stereo near and far points. This is achieved as follows. The left and right marks are first positioned so that they are superimposed. This will appear to give a single image at the surface of the monitor screen. If now the left image is moved to the left and the right image to the right then the single fused image as seen through the viewing spectacles will appear to retreat behind the monitor screen. At some point the disparity between the two marks will be so great that the single image seen by the observer will break up into two separate images. The process may be repeated several times in order to find an average value of disparity at which this break-up occurs. This will be the maximum parallax that the observer can tolerate in the image at the far point.

A similar procedure can be adopted to find the near point by separating the marks such that the right image moves to the left and vice versa. The single fused image now appears to advance in front of the monitor screen and eventually this single image will again break up when the disparity between the two marks becomes too great for the observer to fuse them.

The limits of tolerance of fusion thus obtained can then be used in the computer memory in place of the average value of human tolerance of fusion. The technique is also applicable to other types of 3D television imaging systems. All that will be different is the way in which the measuring marks are introduced into the display so as to be correctly presented to each eye.

In the foregoing arrangements twin cameras have been employed to obtain the stereo images. It is however, possible also to use a single vidicon camera to provide 3D images by employing a time-division or sequential switching technique and various configurations of mirror/prism optics. A further development is to replace the single vidicon with 2 CCD imaging chips. These can be placed either closely side by side or separated by using appropriate optics. The technique enables a full-screen sequentially switched 3D image to be obtained.

FIG. 5 shows a system in which the two CCD chips 31 are at separate locations and their sight beams are merged by fixed optics consisting of respective mirrors 32 and a common prism 33. They share a common lens system 34, beyond which the beams are re-split and directed by a prism 35 and two angularly adjustable mirrors 36. The lens functions and the angular settings of the mirrors 36 are controlled by pre-programmed electronics 37.

Using a single lens, the need for parallel tracking of the lens functions, as in a two-camera system, is no longer required. Also the size of the 3D camera is reduced as well as the weight. The size is particularly significant since a two-camera analogy of a single lens system will always have a greater lateral dimension. Therefore, camera heads with the potential to give good stereo images having a large amount of apparent depth can be made significantly smaller. Using CCD imaging chips certain of the drive circuit functions can be used to operate both devices.

A most important aspect of the single lens system used in this way is the realization that on focusing and zooming the front end mirror convergence must be re-adjusted. Again pre-programmed electronics are used to solve this problem, thus giving the front-end optics some limited intelligence.

Figure 6:
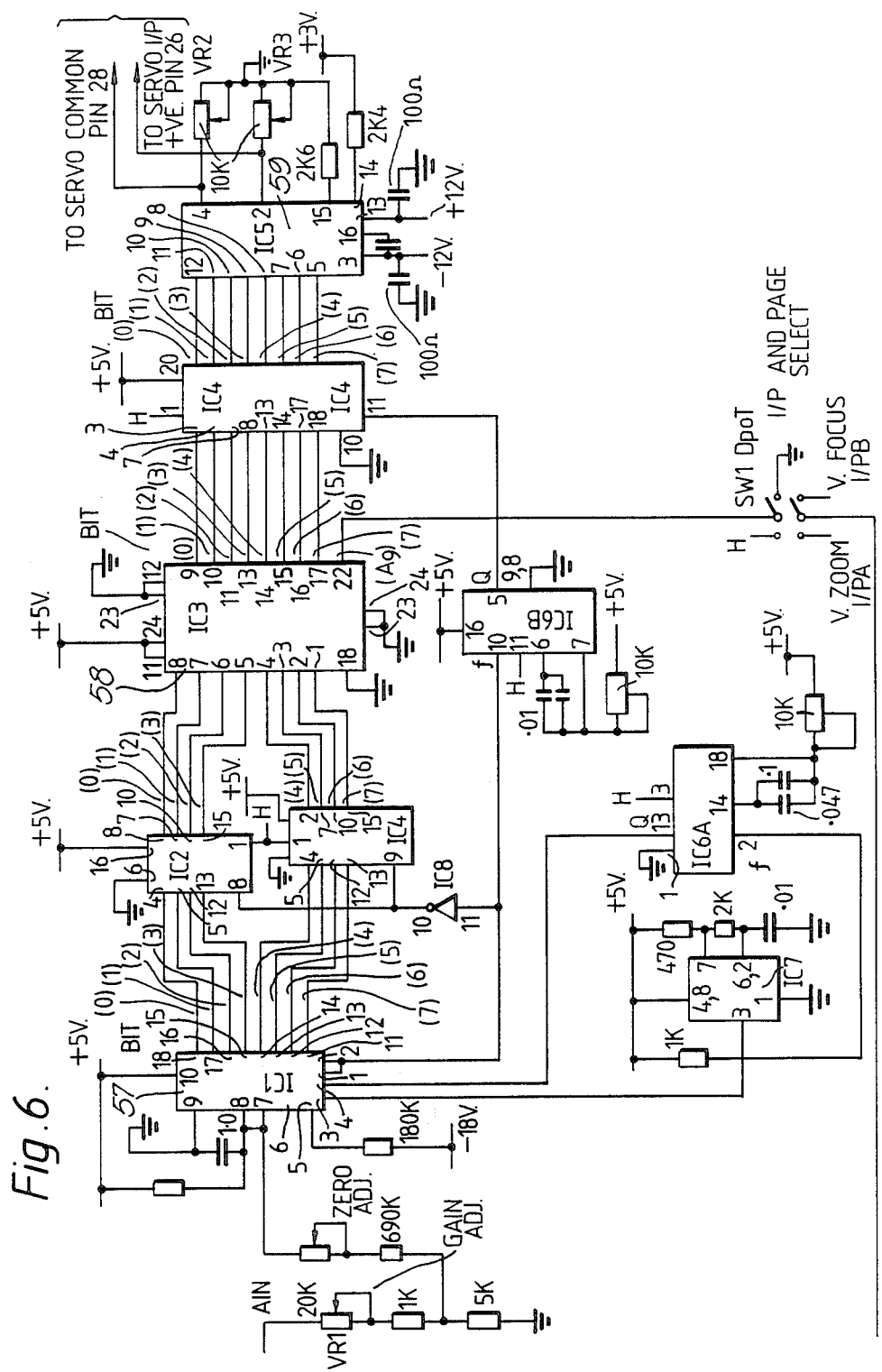
FIG. 6 is a circuit block diagram of control electronics used in the embodiment of FIG. 5.

FIG. 6 illustrates one form of circuit that can be employed as the lens and mirror control electronics 37 of FIG. 5. Since all the functions produce non-linear characteristics (i.e. zoom, focus and convergence) the problem is to produce a non-linear voltage/convergence characteristic from a non-linear source characteristic (either focus or zoom). A way of achieving this is to use a "look-up" table stored in an EPROM for each mode of convergence/zoom and convergence/focus. A d.c. input voltage from either focus or zoom is fed to an analogue-to-digital converter 57 the output of which selects and address in the EPROM 58 containing the correct convergence characteristic value. The data addressed then feeds a digital-to-analogue converter 59 and the resulting d.c. output voltage drives the motor controlling the mirror convergence. Both look-up tables can be stored in the same EPROM and are derived experimentally.

The vision control electronics 60 for the system using two CCD chips can be similar to those shown in FIG. 3.

Another attractive possibility is the construction of a stereo-camera head using fibre optics to reduce even further the size of the package.

PROGRAM FOR APPLE-II MICROCOMPUTER

```
JLIST
10  HOME
15  REM    FIXED PARAMETERS
20  MF = 20
21  FH = 1.75
23  FX = 10.5
25  ZT = 250:DV = 50:TAL = .0058
30  REM ,EVALUATION OF MIN EXTEN
      T
35  REM ,OF COMFORTABLE STEREO RE
      GION
40  BM = 20:FM = 3.5
45  TM = BM / (2 * ZT)
50  FS = FM:B = BM
51  TF = B / (2 * ZT)
52  PO = TAL * DV / MF
55  GOSUB 1500
57  Z1 = ZF
60  ZM = ZF - ZN
70  B = 20:FS = FH
75  TF = B / (2 * ZT)
80  FI = ( ATN (TF)) * 180 / 3.14
85  GOSUB 1500
90  GOSUB 2000
250 PRINT "=========================
    =========="
251 PRINT "TO CHANGE THE VALUE O
    F"
255 PRINT "FOCAL LENGTH TYPE(1)"
256 PRINT "=========================
    =========="
257 PRINT : PRINT
260 PRINT
265 PRINT "TO TERMINATE TYPE(2)"
266 PRINT "=========================
    =========="
270 INPUT DN
273 HOME
275 IF DN = 1 THEN  GOTO 500
300 END
500 PRINT "INPUT THE NEW VALUE O
    F"
510 INPUT "FOCAL LENGTH(MM)";FK
511 HOME
```

```
530 FG = FS
540 FK = FK / 10:FS = FK
550   GOSUB 1500
560   PRINT "EXTENT OF COMFORTABLE
         STEREO"
565   PRINT "REGION WITH THE NEW V
         ALUE OF"
567   PRINT "FOCAL LENGTH WILL BE"
569   PRINT "============================
         ========"
573   PRINT "ZF-ZN=";(ZF - ZN)
575   PRINT
577   PRINT "ZF-ZT=";(ZF - ZT)
578   PRINT
579   PRINT "ZT-ZN=";(ZT - ZN)
580   PRINT
590   IF ZM < (ZF - ZN) THEN GOTO
         250
592   PRINT "============================
         ==========="
600   PRINT "MONITOR PARALLAX WOUL
         D EXCEED"
602   PRINT "ITS MAX.PERMISSIBLE V
         ALUE."
603   PRINT "============================
         =========="
604   PRINT "TYPE(1) IF THE ABOVE
         EXTENT OF"
605   PRINT "COMFORTABLE STEREO RE
         GION IS"
606   PRINT "SUFFICIENT"
607   PRINT "TYPE(2) TO OBTAIN THE
         PREVIOUS"
608   PRINT "EXTENT OF COMFORTABLE
         STEREO"
609   PRINT "REGION"
610   PRINT "============================
         ==========="
615   INPUT PR: HOME : IF PR =
         2 THEN GOTO 800
620   GOSUB 1500
625   GOSUB 2000
630   GOTO 250
800   PRINT "TO USE MAX POSSIBLE V
         ALUE OF"
805   PRINT "FOCAL LENGTH TYPE(1)"
807   PRINT "============================
         =========="
808   PRINT "TO VARY GEOMETRICAL P
         ARAMETERS"
810   PRINT "TYPE(2)"
813   PRINT "============================
         =========="
815   INPUT PQ: HOME : IF PQ =
         1 THEN GOTO 1000
850   B = BM * FM / FK:TF = TM * FM
         / FK
855   FI = ( ATN (TF)) * 180 / 3.14
860   GOTO 620
1000 FS = Z1 * PO / ((2 * TF * Z1
         ) - B)
1010  GOTO 620
1500 ZA = (2 * FS * TF) - PO
1550 ZF = B * FS / ZA
1555 ZE = (2 * FS * TF) + PO
1560 ZN = B * FS / ZE
1600  RETURN
2000  PRINT "ZF-ZN=";(ZF - ZN)
2010  PRINT "CAMERA SEPARATION=";
         B
2015  PRINT "CONVERGENCE ANGLE=";
         FI;"DEGREE"
2020  PRINT "FOCAL LENGTH=";10 *
         FS;"MM"
2100  REM , SENDING SIGNALS TO CO
         NTROL SYSTEM
2200 SF = ((2 ^ 8) - 1) / (FX - F
         H)
2205 CF = INT (SF * (FS - FH))
2210  POKE 49308,CF
2221 BX = 50:SB = ((2 ^ 8) - 1) /
         BX
2225 CB = INT (SB * B): POKE 493
         09,CB
2231 AN = 25.5:SA = ((2 ^ 8) - 1)
         / AN
2235 CA = INT (SA * FI): POKE 49
         310,CA
2500  RETURN
```

I claim:
1. A stereo-camera head, comprising:
   means to adjust at least one of the parameters involved in stereo-scopic viewing from a remote location while the camera head is in use, and
   preprogrammable control means to preset a value of fusion tolerance for maintaining the stereo camera images within human tolerance of fusion limits during such use.
2. A stereo-camera head according to claim 1, further comprising vision control circuitry to receive the left and right camera signal outputs and generate a left and right sequentially switching video signal and control outputs switching in synchronism with the video signal for application to a stereoscopic viewer.
3. A stereo-camera head according to claim 1, wherein said control means includes a microcomputer.
4. A stereo camera head according to claim 1 where the preprogrammable control means is programmable with the average value for the human tolerance of fusion limits.
5. A stereo-camera head according to claim 1, comprising twin cameras mounted on a common base, at least one of said cameras being movably mounted, and motor-driven means for adjusting the mutual convergence of the cameras.
6. A stereo-camera head according to claim 5, comprising motor driven means for varying the mutual separation distance of the two cameras.
7. A stereo-camera head according to claim 6, wherein each camera is rotatably mounted on a respective carrier which is in turn mounted to traverse along a respective lead-screw driven by a respective stepper motor.

8. A stereo-camera head according to claim 5, further comprising motor-driven means for adjusting the focus of both cameras simultaneously.

9. A stereo-camera head according to claim 8, further comprising motor-driven means for adjusting the zoom controls of both cameras simultaneously.

10. A stereo-camera head according to claim 9, further comprising motor-driven means for adjusting the iris controls of both cameras.

11. A stereo-camera head according to claim 9, wherein each camera is mounted on a respective support cradle and each support cradle is pivotally mounted on said common base to pivot about a substantially vertical axis located adjacent the front end of the respective camera.

12. A stereo-camera head according to claim 11, wherein one camera is adjustably mounted on its respective support cradle for achieving geometrical alignment.

13. A stereo-camera head, comprising:
means to adjust at least one of the parameters involved in stereo-scopic viewing from a remote location while the camera head is in use,
control means for maintaining the stereo camera images within human tolerance of fusion limits,
a video display, and
means for injecting left and right measuring markers into the video display that can be moved at will within the area of the screen to enable an individual to perform a test for determining personal tolerance of fusion limits for entry into the camera control means.

14. A stereo-camera head according to claim 13, comprising twin cameras mounted on a common base, at least one of said cameras being movably mounted, and motor-driven means for adjusting the mutual convergence of the cameras.

15. A stereo-camera head according to claim 14, further comprising motor-driven means for adjusting the focus of both cameras simultaneously.

16. A stereo-camera head according to claim 15, further comprising motor-driven means for adjusting the zoom controls of both cameras simultaneously.

17. A stereo-camera head according to claim 14, comprising motor-driven means for varying the mutual separation distance of the two cameras.

18. A stereo-camera head according to claim 17, wherein each camera is rotatably mounted on a respective carrier which is in turn mounted to traverse along a respective lead-screw driven by a respective stepper motor.

19. A stereo-camera head, comprising:
means to adjust at least one of the parameters involved in stereo-scopic viewing from a remote location while the camera head is in use,
a single camera lens system,
beam splitting/combining means, and
separate left and right movable optical elements which transmit left and right images through the single camera lens system via the beam splitting/combining means.

20. A stereo-camera head according to claim 19, further comprising two CCD imaging chips receiving the left and right images from said single camera lens system via a second beam splitting/combining means.

21. A stereo-camera head according to claim 19, further comprising control circuitry for said single camera lens system and said left and right movable optical elements which control circuitry includes means for generating non-linear convergence/zoom and convergence focus control characteristics.

22. A stereo-camera head according to claim 21, wherein said non-linear control characteristics generating means comprise memory means in which look-up tables are stored.

* * * * *